United States Patent [19]
Lhymn et al.

[11] Patent Number: 5,419,357
[45] Date of Patent: May 30, 1995

[54] LEAKAGE FREE RELIEF VALVE OR FUSE PLUG FOR PROTECTING PRESSURIZED DEVICES FOR OVER PRESSURE DUE TO FIRE

[75] Inventors: Chang Lhymn; Yoon O. Lhymn, both of Erie, Pa.

[73] Assignee: Summit Composite International, Erie, Pa.

[21] Appl. No.: 47,201

[22] Filed: Apr. 16, 1993

[51] Int. Cl.$^6$ .............................................. F16K 17/40
[52] U.S. Cl. ........................................ 137/72; 137/74; 220/89.4; 428/614
[58] Field of Search .................... 137/72, 74; 220/89.1, 220/89.2, 89.4; 428/614

[56] References Cited

U.S. PATENT DOCUMENTS

| | | | |
|---|---|---|---|
| 3,638,734 | 2/1972 | Ault | 169/42 |
| 4,103,063 | 7/1978 | Hulse | 415/212 R |
| 4,671,308 | 6/1987 | Williams et al. | 137/72 |
| 4,744,383 | 5/1988 | Visnic et al. | 137/74 X |
| 4,962,003 | 10/1990 | Lhymn et al. | 428/614 |
| 5,223,347 | 6/1993 | Lhymn et al. | 428/614 |

Primary Examiner—Martin P. Schwadron
Assistant Examiner—Kevin L. Lee

[57] ABSTRACT

A unique design for improved creep strength with a leakage-free structure is presented for manufacture of creep-resistant pressure relief device (PRD) of valves or cylinders or any pressure vessels as a fire protection safety device, the new design being the combination of geometrical configuration of PRD body shell and composite technology wherein the relatively weak matrix phase is dispersed with strong reinforcing agent and such composite mixture of matrix phase/reinforcing agent is contained in a nonslip structure of PRD cavity with a length/diameter ration being greater than about one such that the external load is transferred to the PRD structural body via stress transfer mechanism through reinforcing agents. The PRD's or fuse plugs fabricated by techniques of the present invention exhibit pronounced creep strength and show no gas leakage under high pressure/elevated temperature conditions realized during fires.

9 Claims, 1 Drawing Sheet

LEAKAGE FREE RELIEF VALVE OR FUSE PLUG FOR PROTECTING PRESSURIZED DEVICES FOR OVER PRESSURE DUE TO FIRE

BACKGROUND

The internally pressurized hardwares such as tanks, boilers, valves, cylinders, pipelines, etc. require thermal safety against disastrous explosion. The thermal safety is generally provided by a fusible alloy which melts at an elevated temperature to allow the pressurized gas or liquid to be released. Therefore, said fusible alloy device is always under a high pressure and it is essential that said fusible alloy used as a fuse plug must withstand high pressure without any creep or extrusion or leakage. The zero creep requirement is also crucial for fusible links used in fire sprinkler systems as a fusible link for thermal safety, because said fusible link is under a constant load.

Fusible plugs for pressurized hardwares can be inserted/mounted to said tanks, cylinders, or such hardwares (plug insertion). Alternatively said hardware itself can have, for example, a threaded cavity and the fusible alloy can be filled into such cavity to seal said hardware (direct insertion). For a fusible link of fire sprinklers, alloy is filled into a cavity of a cylinder which acts as a link structure.

As the temperature and pressure conditions for creep strength become highly demanding, the intrinsic strength of the alloy, whether monolithic Or composite, reaches a limit and thus some kind of extrinsic design considerations must be given to share the applied load between the intrinsic strength of the alloy and extrinsic structure of the alloy-supporting member. This is especially so when the service temperature reaches an upper limit close to the melting point of fusible alloy. In general, alloys dispersed with reinforcing agents such as fibers, particles, shots, platelets, cubes, or any other geometrical materials i.e., composite alloys, can enhance the intrinsic strength of the matrix alloy but their intrinsic strengthening effect has a certain limit and beyond such limit the extrinsic strengthening effect must be generated to support a highly demanding load at an elevated temperature.

It is the aim of the present invention to provide such extrinsic strengthening effect via stress transfer or load sharing mechanism in which the applied normal load is shared both by the alloy-supporting or alloy-holding structural member and by the alloy itself. The load-sharing mechanism is achieved by a special design of the fuse plug geometry and also by the dense dispersion of reinforcing agents throughout the matrix alloy phase. The special design feature of said fuse plug consists of nonslip surface of the plug cavity containing the alloy in such a way that reinforcing agents are supported by the rough, rugged, nonslipping, threaded, and tapered surface, while such agents can be released away when the matrix alloy fuses to provides the mobility in case of fire, for instance.

When a fuse plug is under a high pressure, extrusional flow does not occur if the applied load is shared by the rigid PRD cavity structure in such a way that the stress born by the alloy is small enough not to break the intermetallic bonding force. If the normal extrusional stress is somehow transformed to shear stress, then the PRD wall structure can share the externally applied stress to alleviate the load born by the alloy. It is one of the functions of spherical shots to provide a spiral or zigzag path so that a shear force is exerted to shots and ultimately to the rigid wall via stress transfer mechanism.

The geometry of shots is generally spherical and the advantage of shots lies in increased compressive strength, uniform stress distribution, increased hardness, reduced stress cracking, excellent flow behavior, increased rigidity, dimensional stability, uniform dispersion, and high load capacity. Other geometries such as particles of irregular shape or fibers can be used as reinforcement but the flow behavior deteriorates with the increase of their content, Another known problem is the stress corrosion of brass, the source of stress being the torque in threaded regions. Because of this stress corrosion cracking, the PRD must be replaced with the new one quite often to shorten the service life of PRD. Such stress corrosion effect can be solved by increasing the thickness of threaded part, by using the body material more resistant to corrosion such as phosphor bronze, or by coating the conventional brass with corrosion-resistant material such as tin, nickel, chromium, or other inert films.

The length of the cavity must be greater than a minimum to meet the required creep resistance. If the cavity length/diameter ratio is less than a certain minimum value, the creep strength is not met even though all other conditions such as nonslip PRD internal surface and strong reinforcement of the matrix alloy are satisfied.

It is the aim of the present invention to outline the detailed conditions for creep strength in an integrated fashion.

DETAILED DESCRIPTION OF PREFERRED EMBODIMENT

Figure 1:
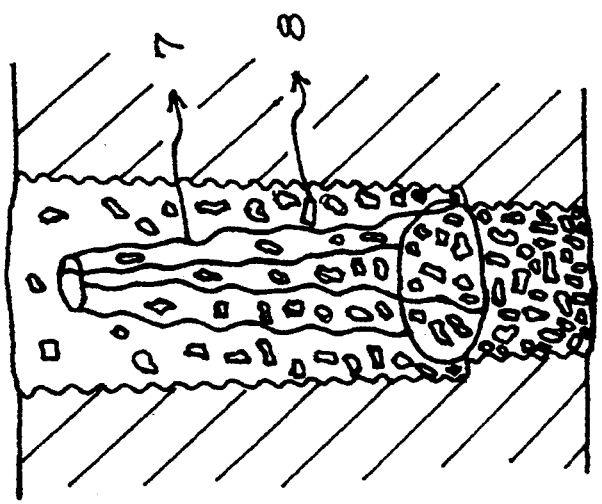
FIG. 1 is a cross sectional view Of threaded PRD cavity filled with reinforcing agents such as aggregates and shots.

The creep-resistant design features consist of composite alloy contained in a nonslip supporting structural member with the cavity length/diameter ratio being greater than a minimum. The "nonslip" character of said structural member can be a threaded cavity of any geometry, non-smooth hole of any shape, tapered rough surface, or any other configuration that can contain the composite alloy within said structural member by surface roughness, by special support, by ridge, or by threads of any geometry.

The composite alloy is comprised of the fusible matrix alloy dispersed with strong agent such as shots, particles, fibers, platelets, or any other geometrical shape.

Generally, the size of reinforcing agents is desired to be less than the dimension of the surface roughness of PRD cavity structure, so that reinforcing agents can be supported by the roughness of PRD structural member, i.e., no slipping under a load. The combination of non-slipping PRD cavity surface an dispersed reinforcing agents allow the externally applied stress to be transferred to the structural member via stress transfer mechanism at the matrix/agent interface. The effective transfer of stress can be achieved when the concentration of agents is high and also when the interfacial bonding at the agent/matrix and at the PRD cavity body/alloy is intimate, i.e., free of voids and defects. It is, therefore, desirable to have a large amount of reinforcing agents for effective stress transfer as long as the composite alloy is flowable in the molten state. Such maximum concentration of agents depends on the agent size and shape. Generally, the larger the size, the higher the concentration but approximately less than about 65 volume %.

Even if the size and amount of reinforcing agent satisfy the creep-resistant conditions, the cavity of PRD structural member must meet the geometrical requirement for creep strength. For example, the ratio of the cavity length over the cavity diameter must be greater than the minimum, the precise value of such minimum being dependent on the creep strength requirement. For instance, said length(L)/diameter(D) ratio must be greater than about 1.0 for zero creep under 4,200 psi at 180 degree F. for fusible alloy filled with 40 wt. % shots, the melting point of said fusible alloy being about 212 degree F., since said alloy creeps in less than 24 hours with the L/D ratio of 1.0.

In summary, the combination of the following conditions meet the requirement of creep strength.
(1) Formation of threaded, nonslip, or rough surface of PRD cavity or hole containing the composite alloy.
(2) Large amount of reinforcing agents without degrading the melt flowability of composite alloy.
(3) The PRD cavity or hole length/diameter ratio must be greater than a minimum of about one to maintain the rigid strength of composite alloy.
(4) The size of reinforcing agents is comparable to or less than the surface roughness or PRD cavity in order for agents to be supported or locked by roughness entities such as threads, ridges, protrusions, bumps, or any other features that can support the agents.

Specific applications of aforementioned load-sharing design are fusible safety plug as a thermally activated pressure relief device of valves, cylinders, or any other pressurized hardwares, a fusible link of fire sprinkler systems, a thermal plug of pressurized pipes or tanks, and any other devices that require high creep strength without changing the melting point. The preceding applications provide the thermal safety by releasing the pressurized medium inside the container through the melting of fusible alloy when the environmental temperature reaches a specific fusing point of the alloy. Therefore, it is necessary to increase the creep strength of the alloy without raising the fusing temperature of said alloy. This requirement is met by satisfying the preceding combination of four conditions, Another strong advantage of the present invention is that the aforementioned four design features can be implemented in a straight cavity PRD such that the gas flow rate can be increased drastically without raising the temperature dangerously too high in a cylinder bonfire test. The spiral cavity filled with conventional (no reinforcement) alloy faced a "freezing problem" in a bonfire test, thus increasing the gas release time and moreover the cylinder fire temperature had to be raised to a dangerous level to overcome said freezing effect. The freezing effect of a spiral cavity is the result of small cavity diameter and long cavity length of spiral geometry as compared to straight cavity. Quite often the space for PRD installation is limited as in a solenoid valve so that the PRD size is required to be reduced without decreasing the cavity diameter or gas flow rate and this is only possible with the straight cavity geometry, because for the same diameter cavity, the spiral geometry requires the larger PRD body than the straight cavity geometry. Hence the size reduction and fast flow rate can be achieved with the straight cavity PRD with the aforementioned four design aspects of the present invention.

In order to enhance the resistance to stress corrosion cracking, the brass PRD body is coated with corrosion-resistant film such as tin, nickel, chromium, or any other inert films. Also the thickness of threaded section is desired to be thick enough to withstand the torque stress-induced cracking in a corrosive environment as long as the space permits such thickness increase. Alternatively, the conventional 360 brass can be replaced with corrosion-resistant phosphor bronze or aluminum bronze, which has a higher tensile strength than "360" brass although the machinability is reduced. In general the bronze material has a better stress corrosion resistance than brass alloy. Other corrosion resistant materials such as stainless steel, Monel, stellite, nickel, Incolloy, Inconel, Hastelloy, niobium, titanium, zirconium, tantalum, or refractory metals can be employed as a PRO body material.

The minimum value of cavity length/diameter ratio is different for different service conditions of temperature and pressure. For stress transfer to occur, the cavity length must be greater than at least the size of reinforcing agent regardless of service temperature and pressure. As the temperature and pressure rise, the cavity length/diameter ratio increases for creep resistance.

The melting matrix phase of the fusible alloy is bismuth-based, tin-based, lead-based, indium-based, gallium-based, or cadmium-based alloy. The matrix alloy can be any fusible alloy comprised of elements selected from the group consisting of tin, bismuth, lead, cadmium, copper, silver, indium, gallium, and antimony.

Generally, the shot content is less than about 60 to 65 volume % for flowability. As the shot amount increases there is an increasing possibility of void formation due to the gradual deterioration of flowability. Hence, as long as the creep strength is satisfactory, it is wise to employ the smallest content of shots. Flowability is destroyed by micron size shot. As the shot size increases, the alloy becomes brittle and macroscopic in property and therefore the use of small size shots is recommended to maintain the microscopic uniformity of properties such as mechanical strength.

A flux of ammonium chloride was used in mixing shots with the fusible alloy in air. This process is inexpensive but produces unhealthy gases as a byproduct of flux decomposition. The mixing can be accomplished by employing nickel-coated metal shots under a nonoxidizing atmosphere. The nickel-coated shots can also be mixed with the fusible alloy in air by pouring the shots into the vortex zone formed by agitating the slurry state alloy. The slurry state alloy is formed by choosing the temperature between the liquidus and solidus of the alloy. In this case the composition of the alloy must be such that it does not melt congruently. Not only nickel coating but also copper coating is also mixable with the fusible alloy matrix phase. Generally any bondable metal coating can be employed as coupling agent such as tin, bismuth, lead, cadmium, silver, gold, nickel, copper, zinc, titanium, chromium, antimony, their base alloys, or any other bondable films. The aim of the preceding three methods comprised of fluxing, nonoxidizing environment, and slurry technique is to achieve a void-free bonding between shots and the matrix alloy. In the fluxing method, the flux itself acts as a coupling agent for bonding, whereas the bondable metal coating functions as a coupling agent for both nonoxidizing atmosphere and slurry techniques. Generally established methods are followed in performing coating on shots. For example, prior to coating, steel shots are precleaned by conventional methods which include degreasing and acid-dip processes.

The spherical geometry is the most desired shape as reinforcing agent but other shapes such as nonspherical aggregate, short fiber, plates, cubes, or irregular particles can be utilized as long as they are flowable and also when such composite structures are gas leakage-free. Although the flowability of fiber or aggregate is relatively poor, the presence of fibers or/and aggregates improves the intrinsic creep strength because of the effect of mechanical interlocking, frictional resistance, and different aspect ratio (L/D ratio) when the amount of nonspherical agents is not excessive. The amount of aggregates or/and fibers is limited so as not to generate voids in a hybrid structure containing shots and aggregates or/and fibers. As one example, a hybrid composite is comprised of a major element of spherical shots and minor elements of aggregates or/and fibers, the volume of minor elements being small enough not to degrade the flowability and not to generate voids.

Still another possible structure is the cavity filled with a fusible alloy reinforced with reinforcing agents and a continuous reinforcing structure such as a spring or wavy beam, such continuous structure being loose and supported by the plug shell. Furthermore, such continuous reinforcement must not generate voids.

The melting point of the matrix alloy is lower than about 600 degree F. However, any fusible alloy whose melting point is lower than that of reinforcing agent can be employed as the matrix phase.

The content of reinforcing agents must be greater than a minimum for creep resistance and must be less than a maximum for leakage proof structure. The precise value of such minimum and maximum depend on the test conditions such as temperature, pressure, plug cavity diameter, test duration, and alloy composition. For example, in order to achieve the "no visible extrusion" creep strength at 180 degree F. under 4,200 psi for an alloy fusing at 212 degree F., the reinforcement with about 45 to 55 wt. % is required for safety against both creep and leakage. In general, the maximum point is determined by the composition above which the melt flowability starts to deteriorate. For compositions above the flow deterioration point there is a strong tendency of gas leakage.

The diameter of shot must be smaller than the plug cavity diameter. However, for microscopic uniformity of properties and clean removal out of the cavity when fused, the small size shot is preferred. For example, for cavity diameter of about 0.25 inch, shots less than 2 mm in diameter are employed.

The material of reinforcing agent (shot, aggregate, or fiber) is steel, iron, nickel, chromium, copper, titanium, refractory metals, stainless steel, their base alloys, any ceramics coated with bondable film, any plastics coated with bondable film, any metals coated with bondable film, or any other strong bondable materials. The material of said bondable film on reinforcing agents can be nickel, copper, tin, lead, zinc, bismuth, cadmium, silver, gold, titanium, chromium, refractory metals, their base alloys or any other bondable materials.

The geometry of PRD cavity can be a threaded one, tapered one, spiral one, curved one, straight one, or any other shape. For a fast gas flow rate, a straight cavity is preferred and threads or some kind of surface roughness are present on the cavity surface. Tapering of the cavity in addition to threading enhances the creep resistance and typical angle of tapering is about 4 degrees.

For a matrix alloy comprised of tin, bismuth, and lead which melts at 207 to 225 degree F., the creep testing was performed at 180 degree F. under 4,200 psi. The conventional alloy extruded to about 0.01 inch in 2 hours, while the same alloy matrix reinforced with 45 wt. % steel shot exhibits no visible extrusion in 500 hours of no gas leakage.

Figure 2:
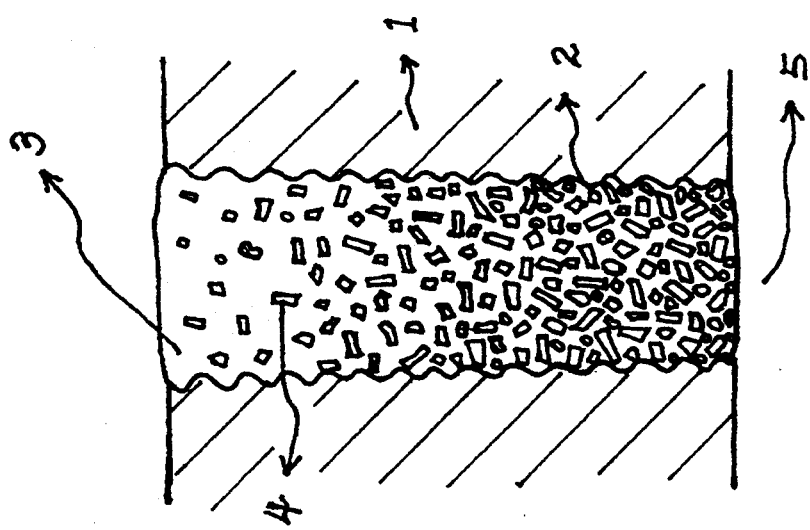
FIG. 2 is a cross sectional view of threaded PRD cavity filled with particles, cylinders, platelets, and cubes with a secondary structure of wavy beam embedded in the matrix alloy.
Figure 3:
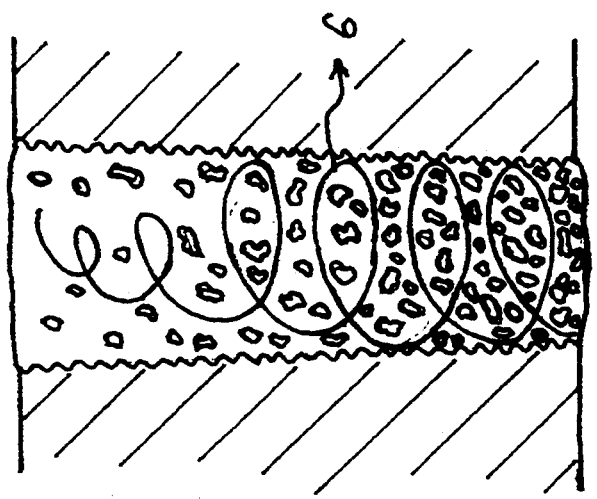
FIG. 3 is a cross sectional view of threaded PRD cavity filled with aggregates and secondary spring structure in the matrix alloy.

In a preferred embodiment, the PRD or plug body 1 has a straight threaded cavity 2 filled with fusible alloy matrix phase 3 reinforced with shots 4. The cavity is tapered, having a large diameter at high pressure side and reduced diameter at atmospheric side 5. The L/D ratio of PRD cavity is about 3. FIG. 1 shows the structure of composite alloy without any secondary reinforcing structure. FIG. 3 shows the structure of PRD cavity with secondary reinforcing structure which is in this drawing a spring 6 supported by threads. FIG. 2 shows another secondary structure of wavy beam 7 embedded in the fusible alloy reinforced with aggregate 8.

EXAMPLE 1

Spherical steel shots of about 0.1 to 0.5 mm in diameter were mixed with the slurry state fusible alloy under agitation. Shots were coated with nickel and the shot content was about 40 to 50 weight %. The brass plug cavity is straight threaded with the L/D ratio of about 2.5 to 3 and the cavity was filled with the composite alloy. The kinds of matrix alloy are:

(a) 56 wt. % Bismuth, 22 wt. % Lead, and 22 wt. % Tin
(b) 50 wt. % Bismuth, 30 wt. % Lead, and 20 wt. % Tin
(c) 46 wt. % Bismuth, 34 wt. % Lead, and 20 wt. % Tin
(d) 45 wt. % Bismuth, 35 wt. % Lead, and 20 wt. % Tin
(e) 52.2 wt. % Bismuth, 37.8 wt. % Lead, and 10 wt. % Tin
(f) 54.5 wt. % Bismuth, 39.5 wt. % Lead, and 6 wt. % Tin
(g) 53.75 wt. % Bismuth, 43.1 wt. % Lead, and 3.15 wt. % Tin
(h) 50 wt. % Bismuth, 24.95 wt. % Lead, 12.5 wt. % Tin, 12.5 wt. % Cadmium, and 0.05 wt. % Silver
(i) 50 wt. % Bismuth, 25 wt. % Lead, 12.5 wt. % Tin, and 12.5 wt. % Cadmium
(j) 51.08 wt. % Bismuth, 39.8 wt. % Lead, 8.12 wt. % Cadmium, and 1 wt. % Indium
(k) 57.42 wt. % Bismuth, 1 wt. % Lead, and 41.58 wt. % Tin
(l) 5 wt. % Bismuth, 32 wt. % Lead, and 45 wt. % Tin

EXAMPLE 2

Nickel-coated steel shots and nickel-coated short steel fibers were mixed with the fusible alloy of example 1 using ammonium chloride as a flux under agitation. The content of shots plus fibers is about 40 to 50 wt. % and the relative ratio of shots/fibers is 4/1. The phosphor bronze PRD cavity of straight thread has L/D ratio of about 3 and the diameter of cavity is ⅛ to ¼ inch. Otherwise identical procedures followed as in example 1.

EXAMPLE 3

Nickel-coated aggregates or stainless steel shots were mixed with the fusible alloy of example 1 using ammonium chloride as a flux. The content of aggregates or shots is about 35 to 50 wt. % and the bronze cavity of straight thread has a L/D ratio of about 2.5. Otherwise identical processes followed as in example 1.

We claim:

1. A thermally activated pressure relief fuse plug for protecting pressure vessels or any pressurized hardware, said fuse plug being free of leakage, said fuse plug being made by the steps of:
   forming a plug cavity with a surface of said cavity bondable to a mixture of fusible alloy and reinforcing agent, said reinforcing agent being selected from the group consisting of spherical shots, cubes, platelets, and cylinders, said fusible alloy being a low melting alloy comprised of elements selected from the group consisting of tin, bismuth, lead, cadmium, gallium, indium, silver, copper, and antimony,
   filling said plug cavity with said mixture of fusible alloy and reinforcing agent, said cavity having a wall structure which is threaded or rugged so that said reinforcing agents are supported by said cavity wall structure,
   exerting a force on said mixture, and
   allowing said mixture to solidify.

2. The fuse plug of claim 1, wherein the material of said reinforcing agent is selected from the group consisting of iron, nickel, chromium, copper, titanium, refractory metals, their base alloys, any copper or nickel-coated metals, any copper or nickel-coated plastics, any copper or nickel-coated ceramics, and any strong plastics, ceramics, or metals coated with bondable metals other than copper or nickel.

3. The fuse plug of claim 1, wherein said reinforcing agent is coated with bondable metals selected from the group comprised of nickel, copper, tin, bismuth, lead, cadmium, silver, gold, titanium, chromium, antimony, zinc, their base alloys, and any other bondable metals.

4. The fuse plug of claim 1, wherein said plug is selcted from the group consisting of bronze, brass, stainless steel, copper, chromium, nickel, cobalt, refractory metals, their base alloys, and other materials resistant to stress corrosion cracking.

5. The fuse plug of claim 1, wherein said mixture is fabricated by introducing said reinforcing agents into the fusible alloy.

6. The fuse plug of claim 1, wherein said fusible alloy is a low melting alloy comprised of elements selected from the group consisting of tin, bismuth, lead, cadmium, gallium, indium, silver, copper, and antimony.

7. The fuse plug of claim 1, wherein said reinforcing agent is not coated with any materials.

8. The fuse plug of claim 1, wherein said mixture is fabricated by introducing said reinforcing agents to the fusible alloy by using a flux.

9. The fuse plug of claim 1, wherein said mixture is fabricated by mixing reinforcing agents and fusible alloy in nonoxidation or reducing atmosphere.

* * * * *